J. KAINEN.
SAFETY APPLIANCE FOR AUTOMOBILES, &c.
APPLICATION FILED AUG. 28, 1919.

1,341,325.

Patented May 25, 1920.
2 SHEETS—SHEET 1.

INVENTOR
JOSEPH KAINEN,
BY Geo. W. Miatt
ATTORNEY

J. KAINEN.
SAFETY APPLIANCE FOR AUTOMOBILES, &c.
APPLICATION FILED AUG. 28, 1919.
1,341,325.
Patented May 25, 1920.
2 SHEETS—SHEET 2.
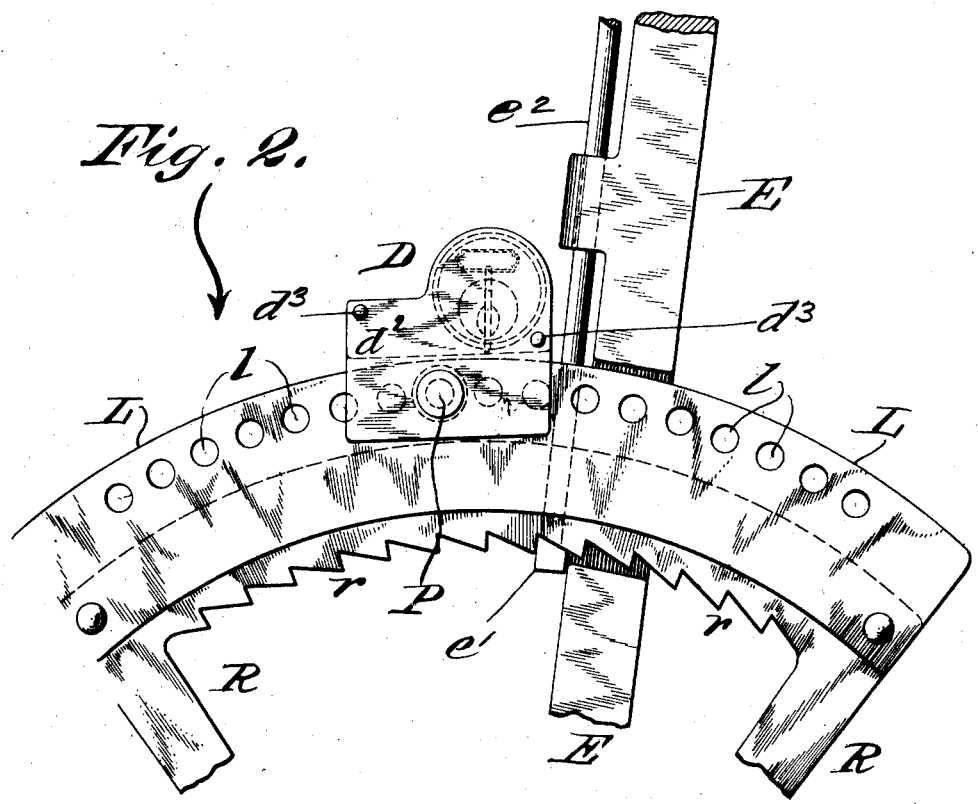
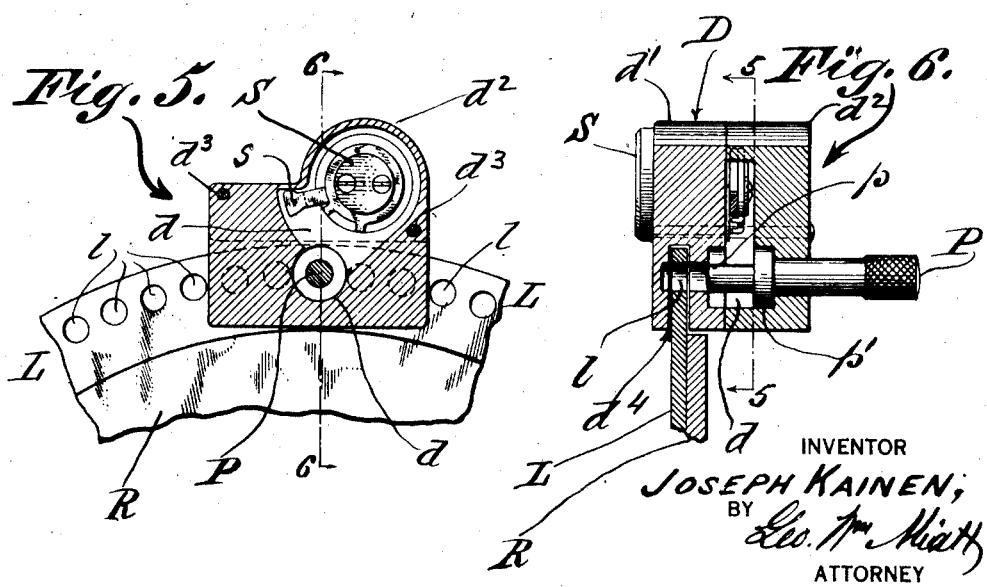
INVENTOR
JOSEPH KAINEN;
BY
ATTORNEY

UNITED STATES PATENT OFFICE.

JOSEPH KAINEN, OF BROOKLYN, NEW YORK.

SAFETY APPLIANCE FOR AUTOMOBILES, &c.

1,341,325.   Specification of Letters Patent.   Patented May 25, 1920.

Application filed August 28, 1919. Serial No. 320,399.

*To all whom it may concern:*

Be it known that I, JOSEPH KAINEN, a citizen of the United States, and a resident of the borough of Brooklyn, county of Kings, city and State of New York, have invented certain new and useful Improvements in Safety Appliances for Automobiles, &c., of which the following is a specification.

The object of my invention is to safeguard automobiles, etc., against accidental or illegitimate movement or travel; and the invention consists essentially in the use, in conjunction with the ratchet sector of the emergency brake lever, of means whereby the latter may be positively held and dogged against release when it is desired to park or otherwise position the car stationary. In other words I provide means whereby the emergency brake may be temporarily set in a permanent manner so that it cannot slip or be tampered with until my safety dog is unlocked, all as hereinafter fully set forth.

In the accompanying drawings,

Fig. 2, is an elevation upon a larger scale, showing the rear side of the usual emergency brake lever ratchet sector in conjunction with my segmental safety lock rack;

Fig. 5, is a sectional elevation taken upon plane of line 5—5, Fig. 6;

Fig. 6, is a sectional elevation taken upon plane of line 6—6, Fig. 5.

A, represents the portion of an automobile body adjacent to the emergency brake lever E, and to which its ratchet sector R, is secured,—said lever E, being fulcrumed at $e$, and connected with the brake in a manner well known in the art. The lever E, is provided with the usual pawl $e'$, for engagement with the ratchet teeth $r$, of the sector R, said pawl $e'$, being pivotally connected by the rod $e^2$, with spring actuated hand rock lever $e^3$, and the function and operation of said emergency lever E, and connections being essentially the same as heretofore.

In juxtaposition and concentric to said usual ratchet sector R, and preferably (although not necessarily) rigidly secured to or forming an integral part thereof, is my segmental locking rail L, formed with a series of holes or recesses $l, l$. Straddling this locking rail L, is my locking dog D, carrying a hand peg P, the inner end $p$, of which is adapted to fit into any of the recesses $l$, in the segmental locking rail L, as shown more particularly in Fig. 4. The plug P, is formed with an annular collar or equivalent shoulder $p'$, situated in a recess $d$, in the dog D; and to this end the said dog D, is formed in two halves or sections $d'$, $d^2$, rigidly united, as by rivets $d^3$, or analogous means,—the recess $d$, being formed between said sections $d'$, $d^2$, and the hand plug P, being positioned thereon and therein before they are thus united integrally, so that the said hand plug P, while having a sufficient degree of reciprocatory movement to admit of the insertion or withdrawal of its inner end into or from one of the recesses $l$, in the lock rail L, cannot itself be withdrawn from the dog D.

Figure 1:
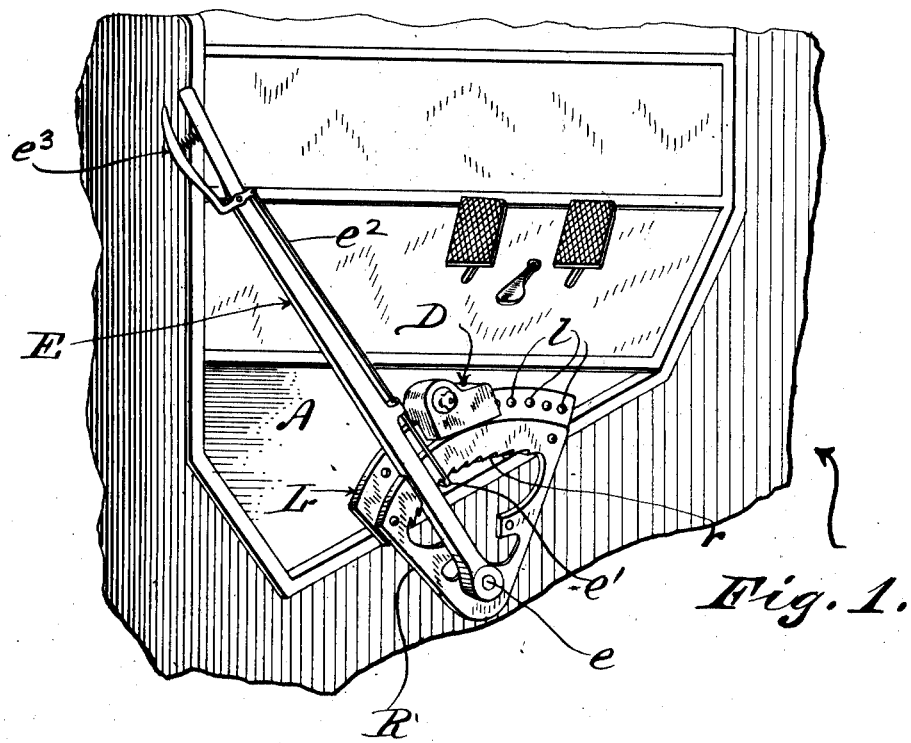
Figure 1, is a perspective view of an emergency lever and adjacent parts of an auto car equipped with my safety appliance.
Figures 3, 4:
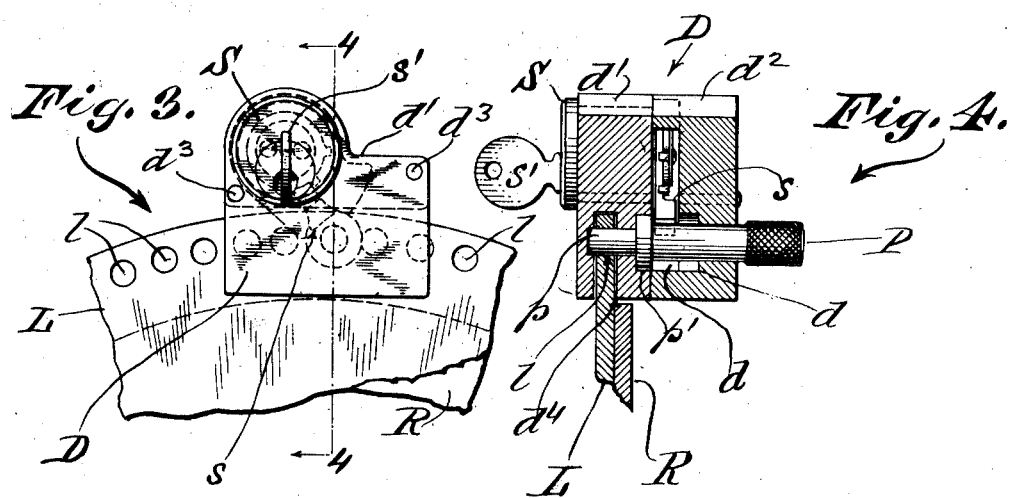
Fig. 3, is an elevation of the front or key side of my safety dog and adjacent part of its segmental lock rack.
Fig. 4, is a sectional elevation taken upon plane of line 4—4, Fig. 3.

The section $d'$, of the dog D, is formed with the straddle slot $d^4$, to admit of the mounting of the dog slidably upon the locking rail L; and in this section $d'$, is also mounted a device S, for securing the plug P, positively in engagement with the locking rail L, when desired,—this securing device S, preferably consisting of a lock of the pin type having a bolt $s$, adapted to be positioned behind the shoulder $p'$, of the plug P, when the inner end of the latter is inserted in one of the recesses $l$, of said locking rail L, as shown in Fig. 4. In Figs. 5 and 6, the bolt $s$, is shown as turned out of engagement with the hand plug P, and the latter as retracted in position.

From the foregoing it will be readily understood that by locking the dog D, on the rail L, immediately in front of the lever E, when the brake is on, the movement of the emergency lever E, may be positively blocked in such manner that the brake cannot be released; and the series of recesses $l, l$, are provided on the locking rail L, for the purpose of compensating for the usual wear upon the brake shoe, so that there need be no lost motion or play if the dog D, is properly set and secured in position on the locking rail L, as related to the lever E, when the brake is set.

By this means a car may be safeguarded against accidental or unlawful movement, when desired, by the simple expedient of locking the dog D, in position immediately in front of the applied emergency lever E, the removal of the key $s'$, from the securing device S, effectually preventing any release of or tampering with said lever by unauthorized persons, or by any one not in possession of a proper key. Furthermore, when not desired for such use, my safety dog D, may be set back, on the rail L, out of the way of the emergency lever E, or entirely removed from said rail if desired, so that said dog need not interfere with or impede the use of the lever E, nor the functions of the pawl $e'$, and ratchet rack R, as related thereto, during running conditions. In fact my device is supplemental to the usual emergency brake mechanism, and necessitates no alteration thereof.

What I claim as my invention and desire to secure by Letters Patent is;

1. A safety appliance of the character designated, comprising, in combination with an emergency brake lever and connections, a recessed segmental locking rail positioned essentially in concentric juxtaposition thereto and in addition to the ratchet sector, a dog adjustable on said locking rail and with relation to said emergency brake lever, and oscillatory means for positively locking said dog on said rail.

2. A safety appliance of the character designated, comprising, in combination with an emergency brake lever and connections, a recessed segmental locking rail positioned essentially in concentric juxtaposition thereto and in addition to the usual ratchet sector, a dog adjustable on said locking rail and with relation to said emergency lever, a hand plug mounted in and on said dog and adapted to engage the recesses in said locking rail, and oscillatory means for positively locking said hand plug in engagement with said locking rail, for the purpose described.

3. A safety appliance comprising a locking rail attachable to the ratchet sector of a motor vehicle and having holes therein, a dog movable on said rail, means engageable with said openings to hold the dog in place, and means mounted to oscillate at right angles to and engageable with said means to prevent endwise movement thereof.

4. A safety appliance comprising a locking rail attachable to the ratchet sector of a motor vehicle and having holes therein, a dog movable on said rail, means engageable with said openings to hold the dog in place, and means mounted to oscillate at right angles to and engageable with said means to prevent endwise movement thereof, both of said means being retained within said dog.

5. A safety appliance comprising a locking rail attachable to the ratchet sector of a motor vehicle and having holes therein, a dog movable on said rail, means engageable with said openings to hold the dog in place, and means mounted to oscillate at right angles to and engageable with said means to prevent endwise movement thereof, said dog having inter-communicating recesses and said means having interengaging parts within said recesses.

6. A safety appliance comprising a locking rail attachable to the ratchet sector of a motor vehicle and having holes therein, a dog movable on said rail, means engageable with said openings to hold the dog in place, and means mounted to oscillate at right angles to and engageable with said means to prevent endwise movement thereof, said dog having inter-communicating recesses and said means having interengaging parts within said recesses, at right angles to each other.

7. A safety appliance embodying a locking rail, a dog in separable sections and slidable thereon, means carried by the dog and passed thereinto to engage the rail and having a shoulder, and key-operated oscillatory means movable in the dog to engage said shoulder to prevent endwise displacement of the first-named means.

JOSEPH KAINEN.

Witnesses:
 GEO. WM. MIATT,
 DOROTHY MIATT.